United States Patent [19]

Tackett

[11] Patent Number: 5,531,513
[45] Date of Patent: Jul. 2, 1996

[54] HIGH PRESSURE ACCUMULATOR/BYPASS VALVE WITH STATIONARY HIGH PRESSURE SEAL

[75] Inventor: Wendell D. Tackett, Ann Arbor, Mich.

[73] Assignee: Kelsey-Hayes, Romulus, Mich.

[21] Appl. No.: 358,186

[22] Filed: Dec. 16, 1994

[51] Int. Cl.⁶ ..................................................... F16K 11/07
[52] U.S. Cl. .......................................... 303/84.2; 137/494
[58] Field of Search .................. 303/84.1, 84.2, 303/900, 901, DIG. 2; 137/494; 251/900

[56] References Cited

U.S. PATENT DOCUMENTS

| | | | |
|---|---|---|---|
| 3,781,063 | 12/1973 | Valpreda | 303/84.2 X |
| 3,806,201 | 4/1974 | Montanari | 303/84.2 X |
| 4,552,172 | 11/1985 | Krieger et al. | 137/494 X |

FOREIGN PATENT DOCUMENTS

| | | | |
|---|---|---|---|
| 656963 | 1/1963 | Canada | 137/494 |
| 346221 | 12/1989 | European Pat. Off. | 251/900 |
| 1380292 | 1/1964 | France | 137/494 |

Primary Examiner—Josie Ballato
Attorney, Agent, or Firm—Brooks & Kushman

[57] ABSTRACT

A combination high pressure accumulator/bypass valve assembly suitable for vehicle control systems such as anti-lock braking systems and traction control systems employs a stationary seal and a reduced part count favoring economy of manufacture and assembly, and eliminates the dynamic seal/light alloy interface, significantly reducing the potential for failure due to pump body/seal abrasion. A caged spring assembly further encourages ease of assembly.

20 Claims, 3 Drawing Sheets

HIGH PRESSURE ACCUMULATOR/BYPASS VALVE WITH STATIONARY HIGH PRESSURE SEAL

TECHNICAL FIELD

The present invention pertains to high pressure accumulator/bypass valves useful in traction control and anti-lock braking systems. More particularly, the subject invention pertains to a high pressure accumulator/bypass valve having a stationary high pressure seal.

BACKGROUND ART

Anti-lock braking systems have now progressed to the point where they are standard on many vehicles. The use of traction control systems is now becoming increasingly widespread, and it is anticipated that their use will parallel that of anti-lock braking systems. In both systems, which may be termed "vehicle control systems," rapid deployment of brake calipers or brake shoes are necessary in order to perform the intended control function. In anti-lock braking systems, when locking of the wheels due to over-application of brake pressure or loss of traction due to the nature of the surface, i.e., gravel, ice, or snow, is encountered, the automotive braking system rapidly pulsates the brakes between an off and an on condition, allowing maximal retention of braking ability while yet retaining the ability to steer the vehicle stably. In traction control systems, loss of traction in a driving wheel is countered by a momentary application of brake pressure, thus restoring traction. In either case, high pressure systems are desirable to effect the rapid changes necessary to achieve the desired control.

In general, the pressure generated by the brake master cylinder cannot be relied upon to achieve the desired results, as response time in such systems is marginal. Moreover, the rapid cycling of the brakes during ABS would quickly deplete the fluid in the master cylinder. To overcome these drawbacks, high pressure pumps, eccentrically driven by an electric motor, supply the high pressure needed to actuate the system. Driving the high pressure pump at all times would be wasteful of energy and further create unwanted noise. Thus, the motor-driven high pressure pump is actuated only when the need for high pressure is sensed by the circuitry associated with the anti-lock braking system or traction control system, as the case may be.

Due to the fact that the high pressure pump is not continually driven, a time lag may exist between the time the motor-driven high pressure pump is actuated and the pump is able to deliver high pressure fluid. Under certain circumstances, the pump may lose its prime, thus further delaying the fluid delivery. It is also desirable to isolate the master cylinder from pressure pulse feedback which can be sensed by the operator. To overcome the aforementioned problems, high pressure accumulators have been used. Such accumulators are filled with high pressure fluid by driving a piston against the force of a strong return spring when the system is initially turned on, for example when the vehicle is initially started. As a result, not only is response time decreased, but the master cylinder may now be isolated during ABS, reducing brake pedal feedback.

If the high pressure pump continues to output high pressure fluid even for a short period of time after the system has become filled, without providing an opportunity to allow fluid to escape to a lower pressure reservoir, both the pump, pressure supply lines, and other components may be damaged by the high pressure. To overcome this problem, bypass valves which operate when a given pressure is reached have been devised. More recently, the high pressure bypass valve and high pressure accumulator have been combined into a single unit, thus saving space as well as number of components.

Combination high pressure accumulator/bypass valves contain sealing rings designed to eliminate the leakage of high pressure fluid. In the past, these seals have been located on the piston element, which slides in a bore in the accumulator body which itself generally shares the same body or housing as the high pressure pump. This same body often also contains sole-noid-actuated control valves and other components necessary for the ABS or TCS system. Thus, to minimize weight, it is desirable to make this body out of a light alloy material such as aluminum. Unfortunately, the combination of high pressure being applied against the sliding seal which, in turn, bears against the light alloy pump body, may induce wear due to the abradability of the light alloy.

Moreover, high pressure accumulator/bypass valve designs of the past have utilized a large number of individual components, including numerous sealing rings, which drive up the costs of both manufacture and assembly.

SUMMARY OF THE INVENTION

The present invention pertains to a high pressure accumulator/bypass valve which employs a stationary seal mounted in the aluminum bore which sealingly engages the surface of the steel high pressure accumulator piston.

The invention further pertains to an improved high pressure accumulator/bypass valve having reduced part count and improved ease of assembly.

The subject invention more particularly pertains to a high pressure accumulator/bypass valve suitable for use in vehicle control systems, having a body of light alloy material containing a stepped bore of at least a first diameter and a second diameter, the second diameter being larger than the first diameter, and having a radially extending shoulder located at the step between the first and second diameters. A cylindrical piston element has a high pressure end and a low pressure end, the diameter of the low pressure end providing a sliding fit within the bore of the first diameter of the body. A cylindrical concentric collar surrounds the piston, the collar having an outer diameter and an inner diameter, the outer diameter of the collar providing a sliding fit within the bore of the second diameter of the body, the inner diameter of the collar providing a sliding fit onto the piston element, and the end faces of the cylindrical collar defining high pressure and low pressure faces. A stationary seal is located in the bore of second diameter between the radially extending shoulder between the stepped bores and the low pressure face of the cylindrical collar, the stationary seal sealingly engaging the piston element. The piston element has at its high pressure end a termination of enlarged diameter. A hollow cylindrical retainer having a high pressure end and a low pressure end and an internal diameter provides a sliding fit onto the enlarged diameter termination of the high pressure end of the piston element. The ends of a prestressed coil spring bear against the termination of enlarged diameter of the piston element on the one hand and the high pressure face of the collar on the other. The interior of the retainer and that portion of the bore in the light alloy material located on the high pressure side of the stationary seal define a high pressure fluid reservoir. A high pressure fluid passage communicates with the high pressure fluid reservoir, and a fluid bypass passage communicates with that portion of the bore in the light alloy material located on the low pressure side of the stationary seal. Relief flow grooves in the piston element proximate the collar, the position and length of which are selected so as to extend past the high pressure seal when the piston element is driven beyond a fixed distance against the pressure of the spring by the high pressure fluid allow fluid from the high pressure reservoir to bypass the seal. The relief flow grooves are further proportioned so as to prevent bypass of fluid from the high pressure reservoir when the piston is not driven beyond the fixed distance. By the terms "high pressure end", "high pressure face", and like terms, is meant the end or face of the particular element located most remotely from the high pressure side of the stationary seal, while "low pressure end" and like terms pertain to that portion of the element in question located most closely to the seal.

The subject invention also pertains to a further embodiment of the above-described valve wherein the high pressure end of the piston includes a spring abutment washer fixedly mounted to the high pressure end of the piston element having an outer diameter which provides a sliding fit within the inner diameter of the hollow cylindrical retainer. A prestressed coil spring bears against the spring abutment washer on the one hand and the high pressure face of the cylindrical collar on the other hand as above described. However, in this embodiment, the spring abutment washer, the cylindrical collar, the coil spring, and the piston element together form a caged spring assembly.

The subject invention high pressure accumulator/bypass valve avoids the wear problems of the prior art by utilizing a stationary seal at the accumulator piston/pump body interface. Moreover, the design of the high pressure accumulator/bypass valve of the subject invention allows manufacture with a highly reduced part count. In the further embodiment of the subject invention, the use of a caged spring further encourages ease of assembly.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
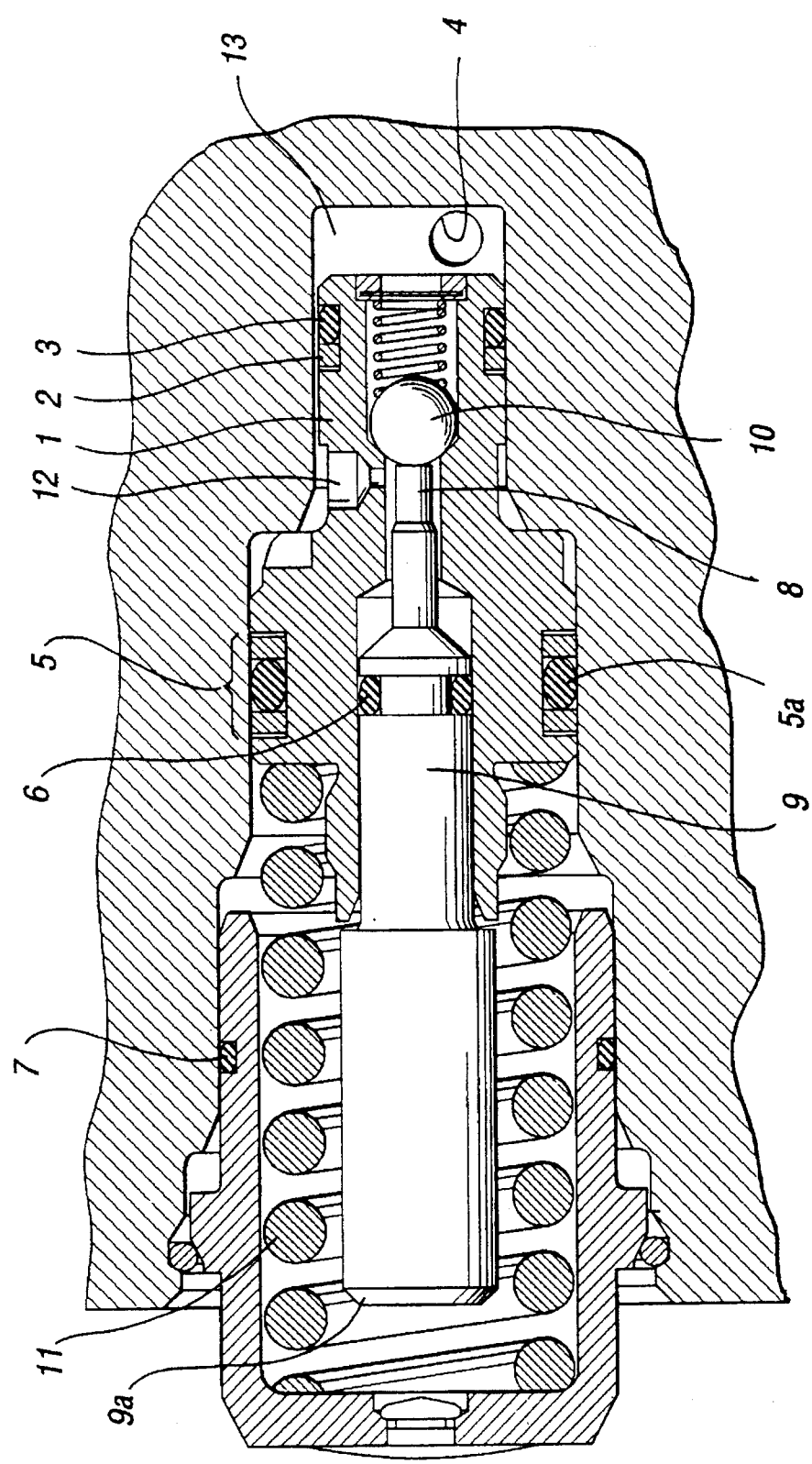
FIG. 1 illustrates a conventional high pressure accumulator/bypass valve having a dynamic seal.

Referring now to FIG. 1, which illustrates a conventional high pressure accumulator/bypass assembly, high pressure fluid enters the device through the high pressure inlet port 4 driving the accumulator piston 1 backwards against the pressure of spring 11. The high pressure fluid is sealed from the backside of the piston by high pressure dynamic seal 2 which is tensioned by elastomeric O-ring 3.

As piston 1 is driven backwards against the spring pressure, eventually the end 9a of plunger 9 bottoms out, whereupon the check ball 10 is forced off its seat by the opposite end 8 of the plunger 9, thus allowing excess high pressure fluid to exit the accumulator through escape port 12. The escaping fluid may be directed to a low pressure accumulator, to the brake master cylinder, or to a fluid reservoir. The plunger 9 is sealed to prevent high pressure fluid from entering the spring end of the accumulator by O-ring 6. Further, seals 5 and 7 eliminate the flow of high pressure fluid into the backside spring cavity. Seal 5, like seal 2, is a dynamic seal tensioned by O-ring 5a against the light alloy bore of the housing.

Sealing O-ring 6 would not be expected to present significant wear, as piston 1, against which O-ring 6 rides, is constructed of steel which has a relatively low abradability. When the high pressure pump shuts down, piston 1 is forced outward by spring 11 until the lightly spring-biased check ball 10 seats and thereby no longer allows brake fluid in to communicate with the low pressure output port. At this point, the accumulator is in a static position, having stored in chamber 13 an amount of high pressure fluid equal to the stroke of piston 1.

As can be seen from FIG. 1, the use of dynamic seals 2 and 5 present a potential wear situation with respect to the light alloy accumulator body, and moreover, the accumulator itself requires numerous parts and additional seals in order to perform its function. The subject invention will now be described with reference to FIGS. 2 and 3.

Figure 2:
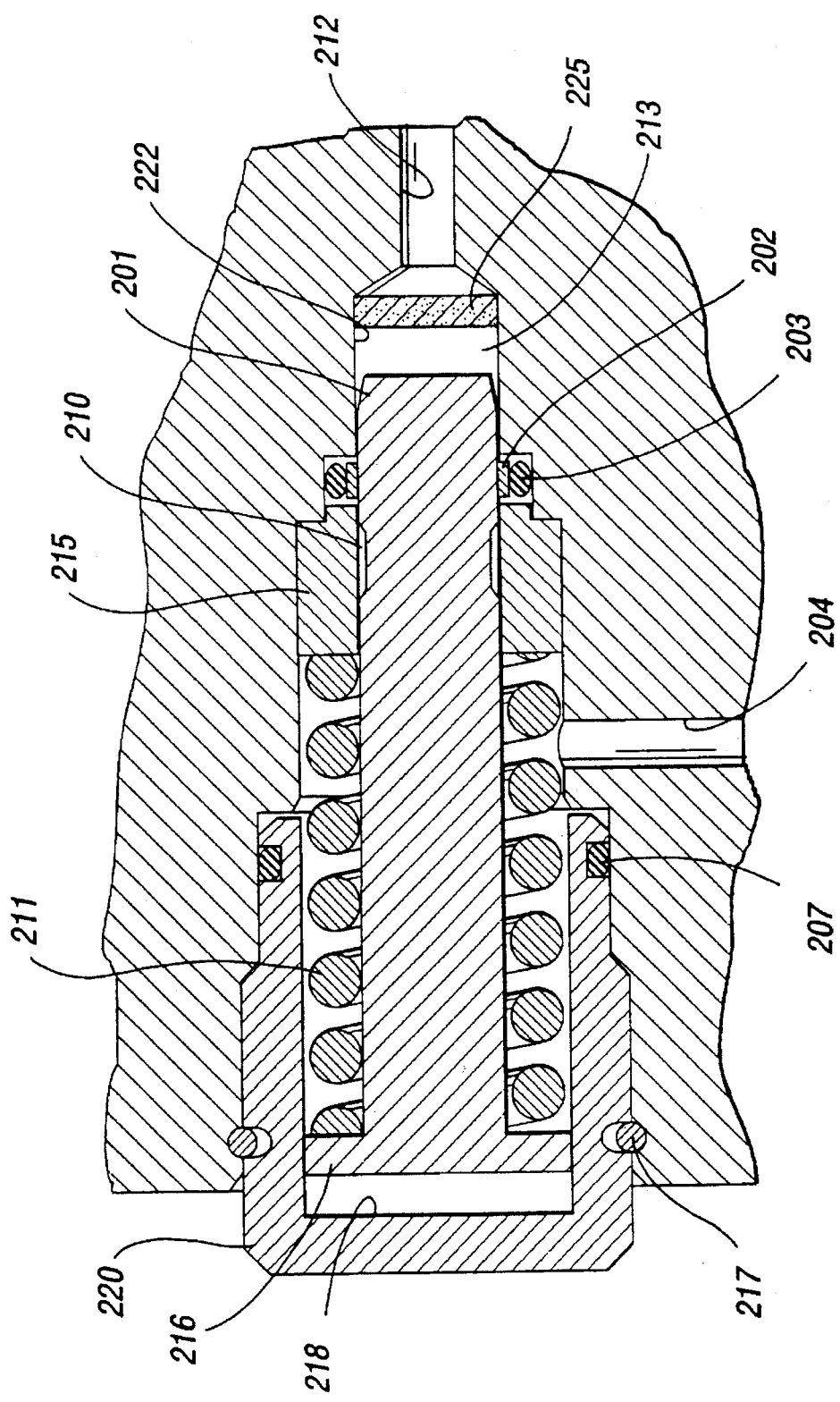
FIG. 2 illustrates one embodiment of the subject invention high pressure accumulator/bypass valve employing a stationary high pressure seal.

Considering FIG. 2, high pressure accumulator piston 201 is a sliding fit in bore 222 of housing cavity 213. Piston 201 is of substantially uniform diameter for the greatest part of its length, terminating in a larger diameter termination 216. Collar 215, located at the end of piston 201 nearest the low pressure fluid escape port 212 is bored to provide a sliding fit for piston 201. The low pressure end face of collar 215 is preferably stepped, and is utilized to trap a stationary high pressure seal assembly between the face of collar 215 located closest to the low pressure port and a step in the bore of the accumulator body. The high pressure seal assembly is preferably composed of cylindrical PTFE seal 202, which is tensioned against the piston element by elastomeric O-ring 203. The end face of collar 215 on the high pressure side serves as an abutment to spring 211, the other end of which abuts enlarged diameter termination 216 of piston element 201. Elastomeric O-ring seal 207 located within retainer 220 seals the high pressure accumulator/bypass valve assembly against the light alloy pump body in which retainer 220 is maintained by snap ring 217. Piston element 201 contains one or more relief slots 210 positioned such that upon obtaining the maximum designed piston stroke, excess fluid bypasses the stationary seal (202,203) and exits through low pressure port 212.

In operation, high pressure fluid from the high pressure pump assembly enters high pressure inlet port 204, thereby pressurizing the fluid chamber or reservoir within retainer 220 and between seals 202 and 207 to this same pressure, including that on the back side of piston end 216, namely between piston end 216 and wall 218 of the retainer 220. This pressure differential between the high pressure end on the back side of the piston end 216 and the lower pressure at the opposite end of piston 201, namely at cavity 213 and the low pressure outlet 212, drives piston 201 outward from wall 218 of the retainer 220 toward low pressure outlet port 212. When piston 201 has traveled its designed distance, the outermost end of relief groove 210 passes the extreme end of the high pressure seal assembly, allowing high pressure fluid to bypass the seal, exiting through port 212 to the low pressure accumulator, master brake cylinder, or fluid reservoir, as the case may be.

In the device shown in FIG. 2, the inside and outside diameter of spring 211 is preferably selected so as to nest with the piston element, thus providing stable guidance of the piston without resort to the use of an internal sleeve or bushing. Clearance between the outside diameter of the piston end 216 and the interior wall of retainer 220, for example, may be maintained at between 0.005 and 0.010 inches. Clearance between the outside diameter of the spring and the retainer is preferably somewhat larger (0.040 inches) to allow evacuation of air in a service bleed environment. The clearance between the inside diameter of the spring and the outside diameter of piston element 201 is advantageously maintained at between 0.010 and 0.025 inches.

The size of the high pressure accumulator/bypass valve is dependent upon system parameters, however, the piston element is nominally approximately 2.2 inches long with a nominal 0.50 inch diameter. Maximum piston stroke is generally limited to about 0.25 inches. Optionally located at the end of the pump nearest the low pressure outlet is porous filter 225, which is useful to trap particulates which may enter the system from the high pressure pump or through wear of the accumulator itself. While stationary seals 202, 203 have been shown as a combination of a PTFE seal and a tensioning elastomeric O-ring, other seals known to those skilled in the art are suitable. A suitable seal is Veriseal S32240-111-42S, available from American Veriseal.

Figure 3:
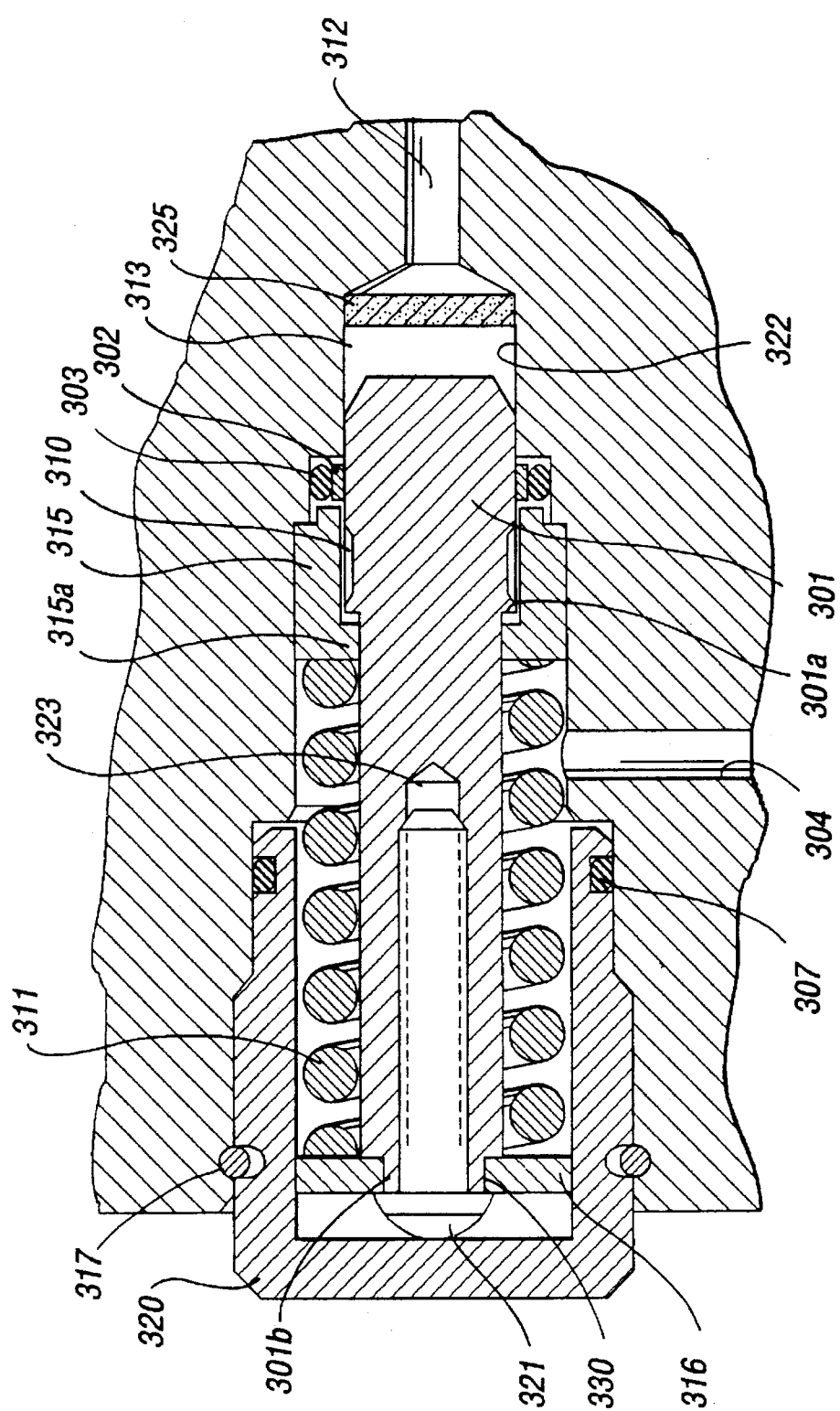
FIG. 3 illustrates a further embodiment of the subject invention high pressure accumulator/bypass valve employing a high pressure stationary seal.

In FIG. 3, there is shown a further embodiment of the subject invention which provides particularly for ease of assembly of the accumulator/bypass valve. Piston element 301 located in bore 322 contains two stepped portions, first step portion 301a and second step portion 301b. First step portion 301a serves to reduce the diameter of the piston element toward the high pressure side of the accumulator, thus enabling retainer 320 and spring 311 to be of smaller diameter, reducing the overall diameter of the accumulator as a result. Further, step 301a provides a seat for the inwardly extending radial portion 315a of collar 315. Step 301b provides a shoulder on which spring retainer 316 abuts, this spring retainer being located by the lesser diameter extension 330 of piston element 301. A bore 323 is threaded to receive retainer screw 321. As a result of the inwardly radially extending portion 315a of collar 315 abutting the shoulder formed at step 301a of piston element 301, and the presence of the spring retainer 316, the piston, collar, spring, and retainer can be assembled separately as a caged spring unit for ease of assembly of the high pressure accumulator/bypass valve.

Moreover, the internal diameter of the inwardly radially extending portion 315a of collar 315 may be a closer fit to the reduced diameter portion of piston element 301, having a clearance, for example, of nominally 0.015 inches. As this portion of the collar is located more remote from bore 322 than the remainder of collar 315, it provides a greater degree of guidance without further increasing frictional constraints between the collar and the piston.

The operation of the high pressure accumulator/bypass valve shown in FIG. 3 is identical to that shown in FIG. 2, with high pressure fluid entering from the high pressure pump at 304, retainer 320 sealed to the pump body bore by elastomeric O-ring 307 and maintained in the body by snap ring 317, elastomeric O-ring 303 providing a tensioning force against high pressure stationary seal 302, and a relief flow groove 310 in piston 301 providing a passage bypassing high pressure seal 302 when the piston 301 has achieved its maximum design stroke. At that point, high pressure fluid may enter cavity 313, flow through optional filter element 325, and through outlet port 312 to the low pressure accumulator, master brake cylinder, or fluid reservoir.

Suitable materials for the light alloy body, piston element, and other components may be readily determined by one of ordinary skill in the art. The pump body, for example, may be extruded 6061T6 aluminum alloy, with the portion of the bore in which the low pressure end of the piston slides having a surface roughness of up to 32 microinches RMS, preferably from 8 to 32 microinches RMS. The piston element may be advantageously constructed of a machine screw grade alloy such as 1215 steel, and having a maximum surface roughness of approximately 16 microinches RMS, preferably within the range of about 8 to about 16 microinches RMS. The designed clearance between the piston and the bore in which it is a sliding fit is on the order of 0.005 inches, preferably from about 0.003 inches to 0.007 inches.

Obviously, numerous modifications and variations of the present invention are possible in light of the above teachings. It is therefore to be understood that within the scope of the appended claims, the invention may be practiced otherwise than as specifically described herein.

What is claimed is:

1. A high pressure accumulator/bypass valve suitable for use in vehicle control systems, comprising:

a body having a stepped bore providing a first diameter and a second diameter immediately adjacent one another, said second diameter being larger than said first diameter, a radially extending shoulder located at the step between said first and second diameters;

a cylindrical piston element having a high pressure end and a low pressure end, the diameter of said low pressure end providing a sliding fit within said bore of said first diameter;

a cylindrical collar concentric to said piston, said collar having an outer diameter and an inner diameter, said inner diameter of said collar providing a sliding fit onto said piston element, the end faces of said collar defining a high pressure face and a low pressure face;

a stationary seal located in said bore of second diameter between said radially extending shoulder and said low pressure face of said collar in a stationary seal retainer space as thereby defined, said stationary seal sealingly engaging said piston element;

a hollow cylindrical retainer having a closed high pressure end, an open end and an internal diameter;

a prestressed coil spring receiving said piston element and having an inner diameter and an outer diameter, the ends of said spring bearing against said piston element and said high pressure face of said collar;

the interior of said retainer and that portion of said stepped bore located on the high pressure side of said stationary seal defining a high pressure fluid reservoir;

a high pressure fluid passage communicating with said high pressure fluid reservoir;

a fluid bypass passage communicating with that portion of said stepped bore located on the low pressure side of said stationary seal;

a relief flow groove in said piston element proximate said collar, the position and length of said relief flow groove selected so as to extend past said stationary seal when said piston element is driven beyond a fixed distance against the pressure of said spring by high pressure fluid allowing fluid from said high pressure reservoir to bypass said stationary seal, said relief flow groove positioned so as to prevent bypass of fluid from said high pressure reservoir when said piston element is not driven beyond said fixed distance.

2. The high pressure accumulator/bypass valve of claim 1, further comprising a spring abutment member fixed to said high pressure end of said piston element and having an outer diameter providing a sliding fit within said internal diameter of said retainer.

3. The high pressure accumulator/bypass valve of claim 2 wherein the difference between the internal diameter of said retainer and said outer diameter of said spring abutment member is from 0.005 to 0.010 inches.

4. The high pressure accumulator/bypass valve of claim 3 wherein said low pressure face of said collar has a longitudinally extending portion formed as a concentric step in said low pressure face, the outermost end face of said longitudinally extending portion together with said radially extending shoulder between said first diameter and second diameter bores of said body defining said stationary seal retention space, the remainder of said low pressure face of said collar bearing against a further step in said bore of said body, said further step having a diameter larger than said second diameter.

5. The high pressure accumulator/bypass valve of claim 2 wherein said low pressure face of said collar has a longitudinally extending portion formed as a concentric step in said low pressure face, the outermost end face of said longitudinally extending portion together with said radially extending shoulder between said first diameter and second diameter bores of said body defining said stationary seal retention space, the remainder of said low pressure face of said collar bearing against a further step in said bore of said body, said further step having a diameter larger than said second diameter.

6. The high pressure accumulator/bypass valve of claim 1 wherein said low pressure face of said collar has a longitudinally extending portion formed as a concentric step in said low pressure face, the outermost end face of said longitudinally extending portion together with said radially extending shoulder between said first diameter and second diameter bores of said body defining said stationary seal retention space, the remainder of said low pressure face of said collar bearing against a further step in said bore of said body, said further step having a diameter larger than said second diameter.

7. The high pressure accumulator/bypass valve of claim 1 further comprising a porous filter element positioned such that fluid exiting the valve through said bypass passage passes through said filter.

8. The high pressure accumulator/bypass valve of claim 1 wherein said collar is a separate element, with said outer diameter thereof being in sliding engagement with said stepped bore; and said piston, said collar, said spring and said retainer are assembled separately as a unit for insertion into said body.

9. A high pressure accumulator/bypass valve suitable for use in a vehicle control system, comprising:

a body having a stepped bore providing a first diameter and a second diameter immediately adjacent one another, said second diameter being larger than said first diameter, a radially extending shoulder located at the step between said bore of first diameter and said bore of second diameter;

a cylindrical piston element having a high pressure end and a low pressure end, a portion of said high pressure end of said piston element having a first diameter and a portion of said piston low pressure end of said piston element having a second diameter, said second diameter larger than said first diameter and providing a sliding fit within said bore of said second diameter;

a cylindrical collar having an outer diameter, and a first inner diameter along a portion of the length of said collar, the end faces of said collar defining a high pressure face and a low pressure face, the high pressure face extending radially inwardly to define a lip of a second inner diameter, said second inner diameter being smaller than said first inner diameter and providing a sliding fit onto said portion of said piston element of said first diameter:

a stationary seal located in said bore of second diameter in said body between said radially extending shoulder and said low pressure face of said collar in a stationary seal retainer space as thereby defined, said stationary seal sealingly engaging said portion of said piston element of said second diameter;

a hollow cylindrical retainer having a closed high pressure end, an open end and an internal diameter;

a spring abutment member fixedly mounted to the high pressure end of said piston element and having an outer diameter providing a sliding fit within said inner diameter of said retainer;

a prestressed coil spring having an inner diameter and an outer diameter, said spring bearing against said spring abutment member and said high pressure face of said collar, said spring abutment member, said collar, said spring, and said piston element together forming a caged spring assembly;

the interior of said retainer and that portion of said bore in said body located on the high pressure side of said stationary seal defining a high pressure fluid reservoir;

a high pressure fluid passage communicating with said high pressure fluid reservoir;

a fluid bypass passage communicating with that portion of said bore located on the low pressure side of said stationary seal;

a relief flow groove in said piston element proximate said collar, the position and length of said relief flow groove selected so as to extend past said stationary seal when said piston element is driven beyond a fixed distance against the pressure of said spring by high pressure fluid allowing fluid from said high pressure reservoir to bypass said stationary seal, and positioned so as to prevent bypass of fluid from said high pressure reservoir when said piston element is not driven beyond said fixed distance.

10. The high pressure accumulator/bypass valve of claim 9 wherein the outer diameter of said spring provides a sliding fit within the internal diameter of said retainer, the inner diameter of said spring providing a sliding fit onto at least a portion of said piston element located on the high pressure side of said stationary seal.

11. The high pressure accumulator/bypass valve of claim 10 wherein said low pressure face of said collar has a longitudinally extending portion formed as a concentric step in said low pressure face, the outermost end face of said longitudinally extending portion together with said radially extending shoulder of said first diameter and second diameter bores of said body defining said stationary seal retention space, the remainder of said low pressure face of said collar bearing against a further step in said bore of said body, said further step having a diameter larger than said bore of said second diameter.

12. The high pressure accumulator/bypass valve of claim 9 wherein the difference between the inner diameter of said retainer and said outer diameter of said spring is from 0.005 to 0.010 inches, and wherein the difference between the inner diameter of said spring and said first diameter of said piston element is from 0.005 to 0.010 inches.

13. The high pressure accumulator/bypass valve of claim 12 wherein said low pressure face of said collar has a longitudinally extending portion formed as a concentric step in said low pressure face, the outermost end face of said longitudinally extending portion together with said radially extending shoulder of said first diameter and second diameter bores of said body defining said stationary seal retention space, the remainder of said low pressure face of said collar bearing against a further step in said bore of said body, said further step having a diameter larger than said bore of said second diameter.

14. The high pressure accumulator/bypass valve of claim 9 wherein said low pressure face of said collar has a longitudinally extending portion formed as a concentric step in said low pressure face, the outermost end face of said longitudinally extending portion together with said radially extending shoulder of said first diameter and second diameter bores of said body defining said stationary seal retention space, the remainder of said low pressure face of said collar bearing against a further step in said bore of said body, said further step having a diameter larger than said bore of said second diameter.

15. The high pressure accumulator/bypass valve of claim 14 wherein said spring abutment member is a washer fixedly mounted to said high pressure end of said piston element by means of a threaded connector threadedly engaged within a threaded recess formed in said piston element.

16. The high pressure accumulator/bypass valve of claim 9 wherein said spring abutment member is a washer fixedly mounted to said high pressure end of said piston element by means of a threaded connector threadedly engaged within a threaded recess formed in said piston element.

17. The high pressure accumulator/bypass valve of claim 16 wherein said piston element further comprises a spring abutment member locating means, said locating means comprising an extension of said high pressure end of said piston element of reduced diameter and a radially concentric bore in said spring abutment member, said radially concentric bore having an inner diameter substantially corresponding to but not less than said reduced diameter of said piston element.

18. A high pressure accumulator/bypass valve suitable for use in vehicle control systems, comprising:

a body having a stepped bore providing a first diameter and a second diameter immediately adjacent one another, said second diameter being larger than said first diameter, a radially extending shoulder located at the step between said first and second diameters;

a cylindrical piston element having a high pressure end and a low pressure end, the diameter of said low pressure end providing a sliding fit within said bore of said first diameter;

a cylindrical collar concentric to said piston, said collar having an outer diameter and an inner diameter, said inner diameter of said collar providing a sliding fit onto said piston element, the end faces of said collar defining a high pressure face and a low pressure face;

a stationary seal located in said bore of second diameter between said radially extending shoulder and said low pressure face of said collar in a stationary seal retainer space as thereby defined, said stationary seal sealingly engaging said piston element;

a hollow cylindrical retainer having a high pressure end, an open end and an internal diameter;

a prestressed coil spring receiving said piston element and having an inner diameter and an outer diameter, the ends of said spring bearing against said piston element and said high pressure face of said collar;

the interior of said retainer and that portion of said stepped bore located on the high pressure side of said stationary seal defining a high pressure fluid reservoir;

a high pressure fluid passage communicating with said high pressure fluid reservoir;

a fluid bypass passage communicating with that portion of said stepped bore located on the low pressure side of said stationary seal;

relief flow groove in said piston element proximate said collar, the position and length of said relief flow groove selected so as to extend past said stationary seal when said piston element is driven beyond a fixed distance against the pressure of said spring by high pressure fluid allowing fluid from said high pressure reservoir to bypass said stationary seal, said relief flow groove positioned so as to prevent bypass of fluid from said high pressure reservoir when said piston element is not driven beyond said fixed distance;

a spring abutment member fixed to said high pressure end of said piston element and having an outer diameter providing a sliding fit within said internal diameter of said retainer;

said low pressure face of said collar having a longitudinally extending portion formed as a concentric step in said low pressure face, the outermost end face of said longitudinally extending portion together with said radially extending shoulder between said first diameter and second diameter bores of said body defining said stationary seal retention space, the remainder of said low pressure face of said collar bearing against a further step in said bore of said body, said further step having a diameter larger than said second diameter.

19. The high pressure accumulator/bypass valve of claim 18 wherein said body is an aluminum alloy and said piston element is a steel alloy.

20. The high pressure accumulator/bypass valve of claim 19 wherein said bore of said first diameter has a surface finish ranging from 8 to 32 microinches RMS.

* * * * *